United States Patent
Kumar et al.

(10) Patent No.: US 11,575,494 B1
(45) Date of Patent: Feb. 7, 2023

(54) LINK STATUS DETECTION FOR A HIGH-SPEED SIGNALING INTERCONNECT

(71) Applicant: NVIDIA Corporation, Santa Clara, CA (US)

(72) Inventors: Seema Kumar, Santa Clara, CA (US); Ish Chadha, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 17/556,512

(22) Filed: Dec. 20, 2021

(51) Int. Cl.
*H04L 25/38* (2006.01)
*H04L 7/00* (2006.01)
*H04L 43/0805* (2022.01)

(52) U.S. Cl.
CPC ........ *H04L 7/0012* (2013.01); *H04L 43/0805* (2013.01)

(58) Field of Classification Search
CPC ..... H04L 7/0012; H04L 43/0805; H04L 1/20; H04L 1/02; H04L 1/14; H04L 12/4135; H04L 7/0008; H04L 43/16; G01R 23/00; G06F 11/348; H04J 3/0605; G05B 19/0423
USPC .......................... 375/369, 370, 354, 356, 358
See application file for complete search history.

(56) References Cited

U.S. PATENT DOCUMENTS

| | | | | |
|---|---|---|---|---|
| 3,934,224 A * | 1/1976 | Dulaney | ................... | H04L 1/14 714/704 |
| 4,611,336 A * | 9/1986 | Fryer | ................... | H04J 3/0605 375/357 |
| 4,672,556 A * | 6/1987 | Shepler | ................... | G01R 23/00 377/107 |
| 4,736,377 A * | 4/1988 | Bradley | ................... | H04L 1/02 714/775 |
| 5,524,213 A * | 6/1996 | Dais | ................... | H04L 12/4135 709/236 |
| 5,561,766 A * | 10/1996 | Kitamori | ................... | H04L 1/20 714/43 |
| 5,822,615 A * | 10/1998 | Yamashita | ......... | G05B 19/0423 710/10 |
| 7,373,565 B2 * | 5/2008 | Adkisson | ............... | G06F 11/348 714/724 |
| 8,761,324 B1 * | 6/2014 | Rosen | ................... | H04L 7/0008 375/220 |
| 2017/0155457 A1 * | 6/2017 | Shinohara | ............... | H04L 43/16 |

* cited by examiner

*Primary Examiner* — Phuong Phu
(74) *Attorney, Agent, or Firm* — Lowenstein Sandler LLP

(57) ABSTRACT

A system includes a first device and a second device coupled to a link having one or more paths associated with transmitting a clock signal. The first device is to transmit a set of bits associated with a pattern via the one more paths. The set of bits are transmitted using a first clock signal having a first frequency less than a second frequency associated with data transmission operations. The second device is to receive the set of bits associated with the pattern, determine a number of pulses associated with the set of bits over a first period, and determine the number of pulses, associated with the set of bits, satisfies a predetermined condition relating to the number of pulses for the first period. The second device is to initiate a training of the link in response to determining the number of pulses satisfies the predetermined condition.

20 Claims, 5 Drawing Sheets

LINK STATUS DETECTION FOR A HIGH-SPEED SIGNALING INTERCONNECT

TECHNICAL FIELD

At least one embodiment pertains to processing resources used to perform and facilitate high-speed communications. For example, at least one embodiment pertains to technology for link status detection in a ground-referenced signaling (GRS) interconnect.

BACKGROUND

Communication systems transmit signals from a transmitter to a receiver via a communication channel or medium (e.g., cables, printed circuit boards, links, wirelessly, etc.) To ensure data is reliably communicated when communicating chip-to-chip (C2C), the communication channel (e.g., link) can be trained before data is transmitted. Before training the link, each chip can determine whether the other chip is ready to initiate link training—e.g., whether the other chip is powered on and ready for link training. Some communication systems attempt to detect a link status (e.g., whether the other chip is ready for link training) by using software-managed initialization. For example, the communication system can have software of one chip communicate with software of the other chip. Software communication can be unreliable or unfeasible in communication systems that utilize multiple chips having different software stacks (e.g., software protocols) where the link is the primary form of communication between the chips. Other communication systems can utilize additional hardware to communicate the link status. Such methods can utilize additional area, cost more, and consume additional resources.

BRIEF DESCRIPTION OF DRAWINGS

Various embodiments in accordance with the present disclosure will be described with reference to the drawings, in which.

DETAILED DESCRIPTION

Figure 1:
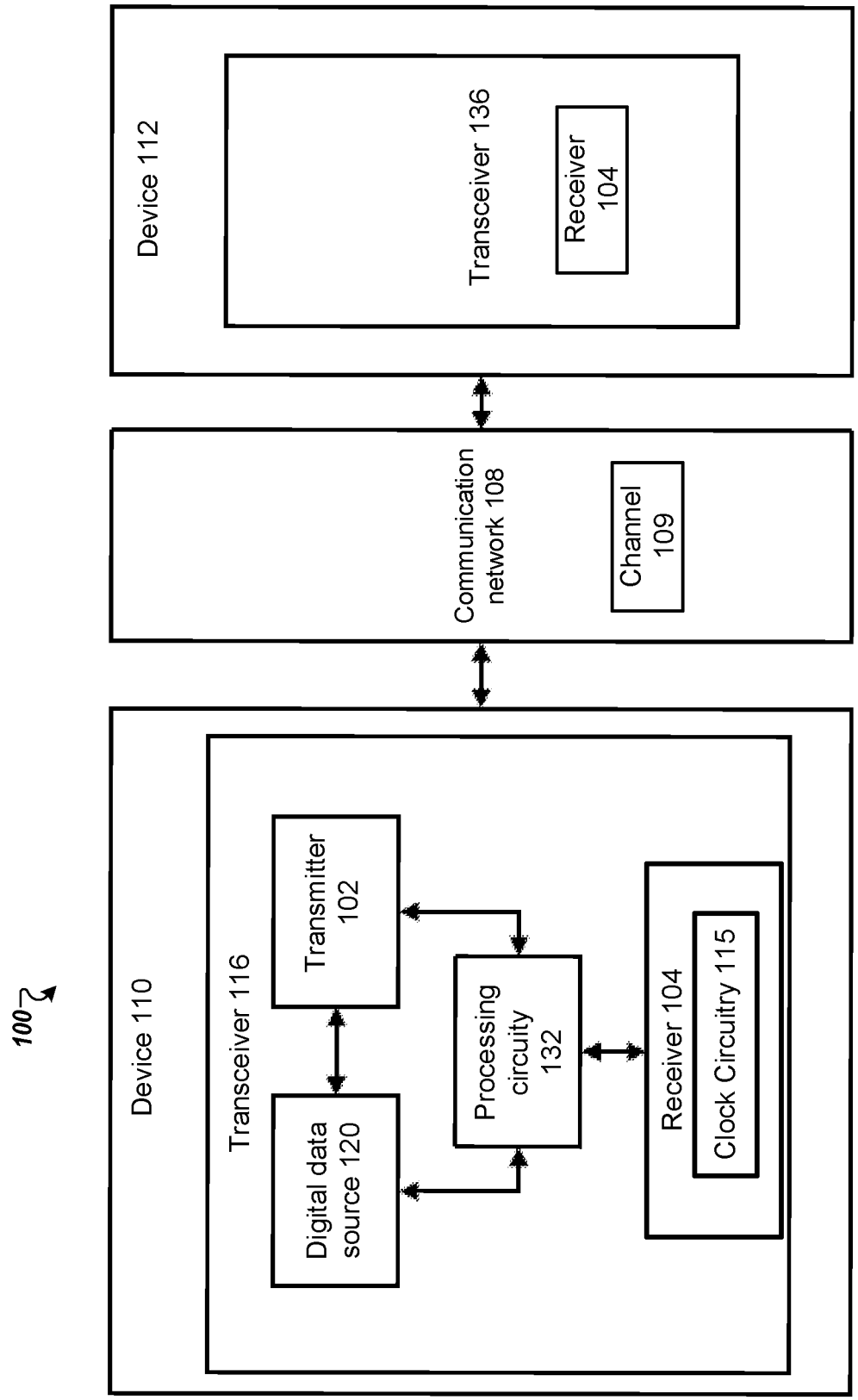
FIG. 1 is an example communication system employing a method for link status detection, in accordance with at least some embodiments.

Communication systems transmit signals from a transmitter to a receiver via a communication channel or medium (e.g., cables, printed circuit boards, links, wirelessly, etc.). Some communication systems train the communication channel or medium (e.g., link) during an initialization sequence (e.g., before data is communicated) to ensure signals are transmitted reliably. Before training the link, each device or chip in the communication system can determine if the other devices in the communication system are powered on and ready for link training—e.g., determine a link status. If the other device is not ready (e.g., not initialized), training the link can fail—e.g., certain components of each device can be initialized before link training can occur. Some communication systems can include multiple devices executing separate (e.g., isolated) software stacks. For example, a communication system may include a first device (e.g., a first integrated circuit (IC) or chip) and a second device (e.g., a second IC or chip) and communicate data via a ground-referenced signaling (GRS) link—e.g., the communication system may be a chip-to-chip (C2C) interconnect with both devices including a transmitter and a receiver. The first device and second device can execute isolated software stacks which can cause the first device and second device to not be synchronized in their initialization sequence—e.g., the first device can be powered on and ready for training while the second device is powered off. That is, because of the isolated software stacks, neither device can rely on software to determine if the other device is powered on, powered off, initializing, coming out of reset, etc., and therefore cannot initiate link training via software.

In some communication systems, sending static patterns indicating the status of the link can be unreliable. For example, as the link is untrained, there can be channel noise or receiver offset—e.g., data can be received at different times across data lanes or data paths of the link. The channel noise or receiver offset can cause aliasing to the static pattern transmitted, resulting in false detections and initialization failures—e.g., the first device receiving the static pattern can falsely determine the second device is ready for link training as a result of aliasing of the static pattern. For example, in a GRS communication system, channel noise can result when data is not actively driven because the link is ground referenced and the termination is also ground. In such examples, the receiver of either device can receive aliased static patterns as a result of the channel noise and falsely determine that the other device is ready for link training. Similarly, looking for a voltage transition to determine the link status is infeasible due to channel noise—e.g., a receiver of the first device or second device can be unable to determine if a voltage transition is a result of a signal sent by the other device or the result of channel noise. Additionally, adding a dedicated pin to indicate link readiness can reduce area on the link, increase costs, and consume additional resources—e.g., adding a general purpose input/output (GPIO) pin to indicate link readiness can take a trace on the PCB, increase costs, and consume additional resources.

Advantageously, aspects of the present disclosure can address the deficiencies above and other challenges by providing a method for link status detection using a dynamic pattern transmitted via a clock lane of the link. For example, when each device is powered on (e.g., comes out of reset or begins an initialization process), each device can initialize its receivers and then its transmitters. Each device can begin transmitting a dynamic pattern at a slow clock speed via the clock lane of the link. For example, each device can transmit the pattern at a clock speed that is less than a clock speed associated with data transmission—e.g., at a speed lower than the high-speed communications. Because the pattern is transmitted at the lower clock speed, the pattern is less affected by channel noise and offset. Additionally, each device can utilize its receivers to detect any incoming patterns. For example, each device can configure counter logic to determine a number of pulses received over a configurable period of time—e.g., the device can determine the average frequency of incoming patterns by detecting edges in the pattern for the period of time. The device can set longer or shorter periods of time based on the amount of channel noise or offset present in the system—e.g., select a longer period of time during which to count the pulses if there is a relatively large amount of channel noise or offset present in the system. Each device can then compare the number of pulses determined to an expected pulse count—e.g., the expected average frequency of the dynamic pattern. When the device determines the number of pulses determined over the period matches the expected number of pulses, the device can determine the link is ready for training—e.g., determine the other device is powered on and initialized. The device can also stop transmitting the slow clock pattern, switch to the full clock speed, and resume the initialization sequence and link training.

For example, the first device can power up, initialize, and begin transmitting the pattern at the slow clock speed over the link to the second device. The first device can also begin detection at the receiver by determining the number of pulses received during the period. Sometime later, the second device can power up, initialize, and begin transmitting the slow clock speed over the link to the first device. The second device can also begin detection at the receiver by determining the number of pulses received during the period. Accordingly, the first device receiver can receive the pattern transmitted by the second device at the slow clock speed and determine the link is ready for training, while the second device receiver can also receive the pattern at the slow clock speed from the first device and determine the link is ready for training. As such, even if the initialization of the first and second device starts asynchronously, at some point during the initialization, each device can concurrently transmit the pattern at the slow clock speed and detect the pattern at the slow clock speed at the receiver. In such examples, both devices can determine whether the other side is ready for link training, stop transmitting the pattern at the slow clock speed, and switch to the high-speed clock.

By utilizing the clock lane of the link to transmit the slow clock speed dynamic pattern, each device of the communication system can determine the status of the link. Because the pattern is transmitted over the clock lane, the communication system can avoid utilizing additional hardware—e.g., transmitting the pattern at the slow clock speed over the data lanes can cause additional hardware to be added to the system. Additionally, the communication system can reliably detect the link status without software intervention or additional GIPO pins dedicated to link status readiness. Accordingly, embodiments of the present application allow for a more reliable method to train the link in a high-speed interconnect system.

FIG. 1 illustrates an example communication system 100 according to at least one example embodiment. The system 100 includes a device 110, a communication network 108 including a communication channel 109, and a device 112. In at least one example embodiment, devices 110 and 112 correspond to one or more of a Personal Computer (PC), a laptop, a tablet, a smartphone, a server, a collection of servers, or the like. In some embodiments, the devices 110 and 112 may correspond to any appropriate type of device that communicates with other devices connected to a common type of communication network 108. According to embodiments, the receiver 104 of devices 110 or 112 may correspond to a graphics processing unit (GPU), a switch (e.g., a high-speed network switch), a network adapter, a central processing unit (CPU), a memory device, an input/output (I/O) device, other peripheral devices or components on a system-on-chip (SoC), or other devices and components at which a signal is received or measured, etc. As another specific but non-limiting example, the devices 110 and 112 may correspond to servers offering information resources, services, and/or applications to user devices, client devices, or other hosts in the system 100. I Examples of the communication network 108 that may be used to connect the devices 110 and 112 include an Internet Protocol (IP) network, an Ethernet network, an InfiniBand (IB) network, a Fibre Channel network, the Internet, a cellular communication network, a wireless communication network, a ground referenced signaling (GRS) link, combinations thereof (e.g., Fibre Channel over Ethernet), variants thereof, and/or the like. In one specific but non-limiting example, the communication network 108 is a network that enables data transmission between the devices 110 and 112 using data signals (e.g., digital, optical, wireless signals).

The device 110 includes a transceiver 116 for sending and receiving signals, for example, data signals. The data signals may be digital or optical signals modulated with data or other suitable signals for carrying data.

The transceiver 116 may include a digital data source 120, a transmitter 102, a receiver 104, and processing circuitry 132 that controls the transceiver 116. The digital data source 120 may include suitable hardware and/or software for outputting data in a digital format (e.g., in binary code and/or thermometer code). The digital data output by the digital data source 120 may be retrieved from memory (not illustrated) or generated according to input (e.g., user input).

The transmitter 124 includes suitable software and/or hardware for receiving digital data from the digital data source 120 and outputting data signals according to the digital data for transmission over the communication network 108 to a receiver 104 of device 112. Additional details of the structure of the transmitter 124 are discussed in more detail below with reference to the figures.

The receiver 104 of devices 110 and 112 may include suitable hardware and/or software for receiving signals, such as data signals from the communication network 108. For example, the receiver 104 may include components for receiving processing signals to extract the data for storing in a memory, as described in detail below with respect to FIG. 2-FIG. 4. In at least one embodiment, receiver 104 can include clock circuitry 115. In some embodiments, clock circuitry 115 can be configured to receive clock signals from clock lanes of the communication network 108. In some embodiments, clock circuitry 115 can detect a link status of the communication network 108 before the link is trained—e.g., the clock circuitry 115 can detect the link status as the first device 110 and/or second device 112 are powered on and initialized. For example, during the initialization sequence, transmitter 124 can transmit a dynamic pattern at a low clock speed (e.g., at a clock speed slower than a clock speed associated with data transmission) across the clock lanes. In such embodiments, the receiver 104 can be configured to receive the pattern at the low clock speed and determine a number of pulses detected over a pre-defined period or duration. If the receiver 104 determines the number of pulses matches an expected number of pulses for the duration, the device 110 or device 112 can determine the link is ready to be trained. Additional details regarding the link status detection are described with reference to FIGS. 2-4.

The processing circuitry 132 may comprise software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132 may comprise hardware, such as an application-specific integrated circuit (ASIC). Other non-limiting examples of the processing circuitry 132 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control the overall operation of the transceiver 116.

The transceiver 116 or selected elements of the transceiver 116 may take the form of a pluggable card or controller for the device 110. For example, the transceiver 116 or selected elements of the transceiver 116 may be implemented on a network interface card (NIC).

The device 112 may include a transceiver 136 for sending and receiving signals, for example, data signals over a channel 109 of the communication network 108. The same or similar structure of the transceiver 116 may be applied to transceiver 136, and thus, the structure of transceiver 136 is not described separately.

Although not explicitly shown, it should be appreciated that devices 110 and 112 and the transceivers 116 and 120 may include other processing devices, storage devices, and/or communication interfaces generally associated with computing tasks, such as sending and receiving data.

Figure 2:
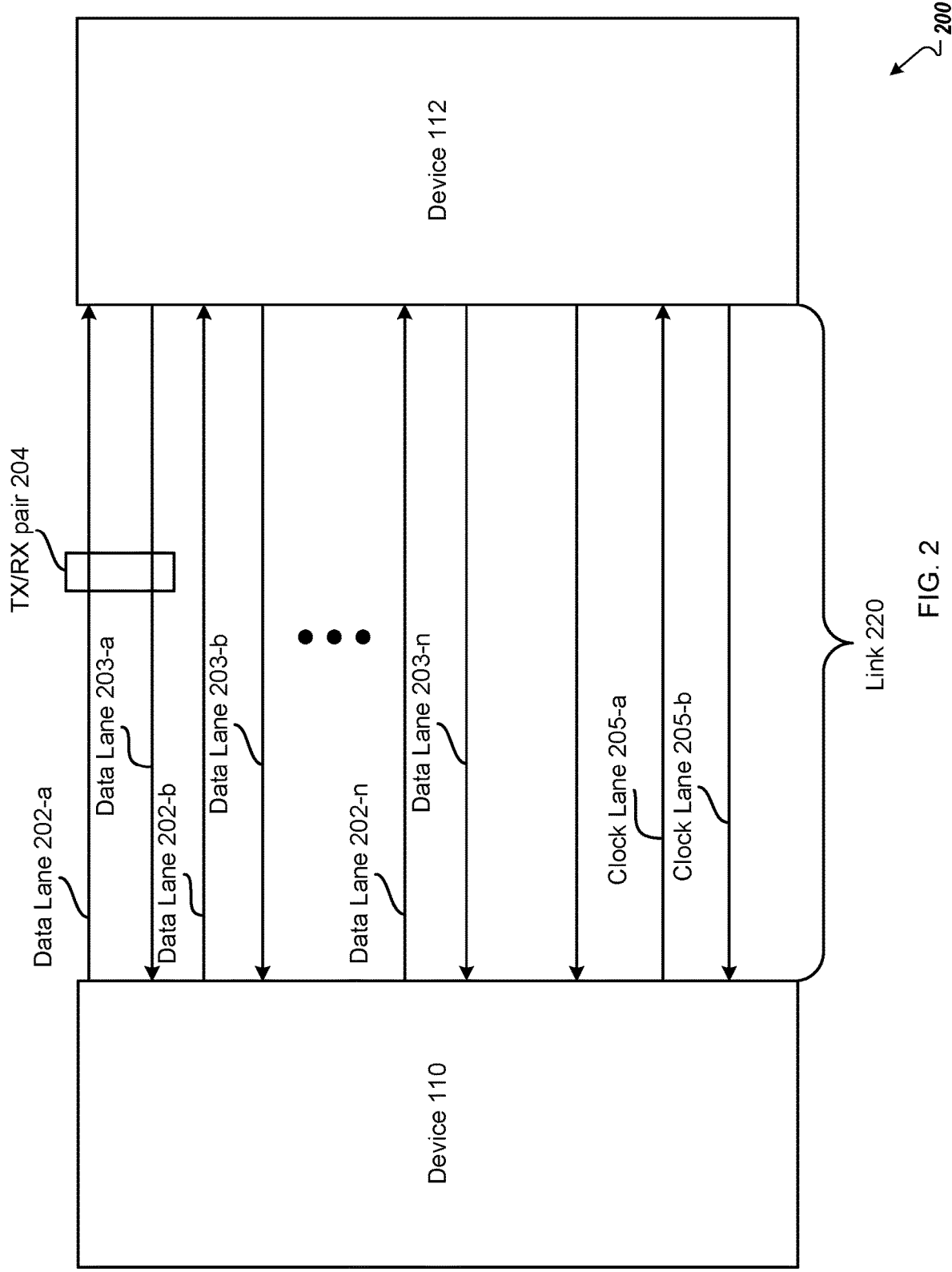
FIG. 2 illustrates an example communication system employing a method for link status detection, in accordance with at least some embodiments.

FIG. 2 illustrates an example communication system 200 according to at least one example embodiment. The system 200 includes a device 110 and a device 112 as described with reference to FIG. 1. The device 110 and device 112 can be coupled to a link 220. In at least one embodiment, the link 220 can be an example of communication network 108 as described with reference to FIG. 1. In at least one embodiment, link 220 can be an example of a high-speed interconnect. For example, link 220 can be an example of a ground referenced signaling (GRS) link 220. In an embodiment, the GRS link 220 can be a signaling scheme used for serial data transfer between devices 110 and 112. In at least one embodiment, the GRS link 220 can be a high-speed link (e.g., transferring 40 gigabits per second (GBPS) at a frequency of 20 gigahertz when performing high-speed communications). In at least one embodiment, the link 220 may include RC-dominated channels and LC transmission lines. Additionally, the GRS link 220 may be an on-chip link, a link across a substrate (e.g., organic package), or link signaling over a printed circuit board (PCB). In some examples, GRS link 220 may use a ground network as a signal reference voltage—e.g., the ground may be the return signaling.

In at least one embodiment, the link 220 can include data lanes 202 and data lanes 203 configured to transmit signals, data, messages, etc., between the device 110 and device 112. For example, data lanes 202 can be associated with communicating signals, data, or messages from device 110 to device 112. Data lanes 203 can be associated with communicating signals, data, or messages from device 112 to device 110—e.g., data lanes 202 can be associated with a transmitter 102 of device 110, and data lanes 203 can be associated with a transmitter of device 112. In at least one embodiment, the link 220 can include a same number of data lanes 202 and data lanes 203. In this embodiment, a data lane 202 can be associated with a data lane 203—e.g., data lane 202-a and data lane 203-a can be a single transmitter/receiver data lane pair 204. In at least one embodiment, the link 220 can include an "N" number of data lane pairs—e.g., an "N" number of data lanes 202 and data lanes 203. In some embodiments, data lanes 202 can be associated with a forwarded clock lane 205-a, and data lanes 203 can be associated with a forwarded clock lane 205-b. In at least one embodiment, each clock lane can be associated with two or more data lanes—e.g., at least two data lanes 202 or data lanes 203. In at least one embodiment, data lanes 202 transmit data to device 112. In such embodiments, the data is latched on the forwarded clock at the receiver of device 112. In some embodiments, data lane 202 and the corresponding data lane 203 are identical—e.g., each data lane 202 and the corresponding data lane 203 support the same signaling speed and include identical drivers and hardware.

In at least one embodiment, device 110 and device 112 can execute isolated (e.g., different) software stacks. In such embodiments, link 220 can be the primary communication between device 110 and device 112—e.g., device 110 and device 112 cannot rely on software-managed initialization. In at least one embodiment, device 110 and device 112 can initialize asynchronously. That is, device 110 and device 112 can be powered up at different times, brought out of reset at different times, or otherwise be at different stages of the initialization process.

In at least one embodiment, link 220 can be trained before communicating data (e.g., functional data) to ensure the data is communicated reliably—e.g., to avoid different delays across the data lanes 202 and data lanes 203. To train the link 220, device 110 and device 112 can be powered on and have completed some initialization—e.g., initialized receivers and transmitters coupled to the link 220. Accordingly, each device 110 and device 112 can determine if the other device is ready for link training before initiating link training—e.g., each device can determine a link status before initiating link training. Because device 110 and device 112 cannot communicate by using software, the device 110 and device 112 can communicate their link status (e.g., that the device is ready for link training) via the clock lane 205 in order to proceed with link training as described herein.

For example, device 110 and device 112 can begin initializing when powered on or brought out of reset. In some embodiments, device 110 and device 112 can initialize a receiver (e.g., receiver 104) first and then initialize a transmitter (e.g., transmitter 124)—e.g., device 110 or device 112 can be initialized to receive and detect incoming signals before beginning to transmit signals. After initializing the receiver and transmitter, device 110 or device 112 can begin transmitting a low-speed (e.g., at a speed slower than a speed of the high-speed clock) pattern on the clock lane 205. In an embodiment, the low-speed can be between 0.5 gigahertz and 2.5 gigahertz. In some embodiments, when the other device is initialized, the other device can also begin sending the low-speed pattern on the clock lane 205 in the other direction. For example, if device 110 is initialized first, device 110 can begin detecting for and transmitting the low-speed pattern first, and when device 112 is initialized, device 112 can also begin detecting for and transmitting the low-speed pattern. Accordingly, although device 110 and device 112 can begin the initialization sequence asynchronously, at some point, both device 110 and device 112 can be concurrently transmitting the low-speed pattern.

In an embodiment, while transmitting the low-speed pattern, device 110 or device 112 can also be detecting incoming signals on the clock lane 205. For example, device 110 or device 112 can detect a number of pulses received in a pre-defined period. The device 110 or device 112 can compare the number of pulses detected with an expected number of pulses for an incoming low-speed pattern. Accordingly, the device 110 or device 112 can determine the link status when the detected number of pulses satisfies (e.g., matches or is equal to) the expected number of pulses for the low-speed pattern. That is, when both device 110 and device 112 are transmitting the low-speed pattern, the other device can determine the link is ready by detecting the low-speed pattern. In such embodiments, device 110 and device 112 can stop transmitting the low-speed pattern, transition from the low-speed pattern to the high-speed pattern, and initiate link training or perform other remnant initialization before initiating link training.

Figure 3:
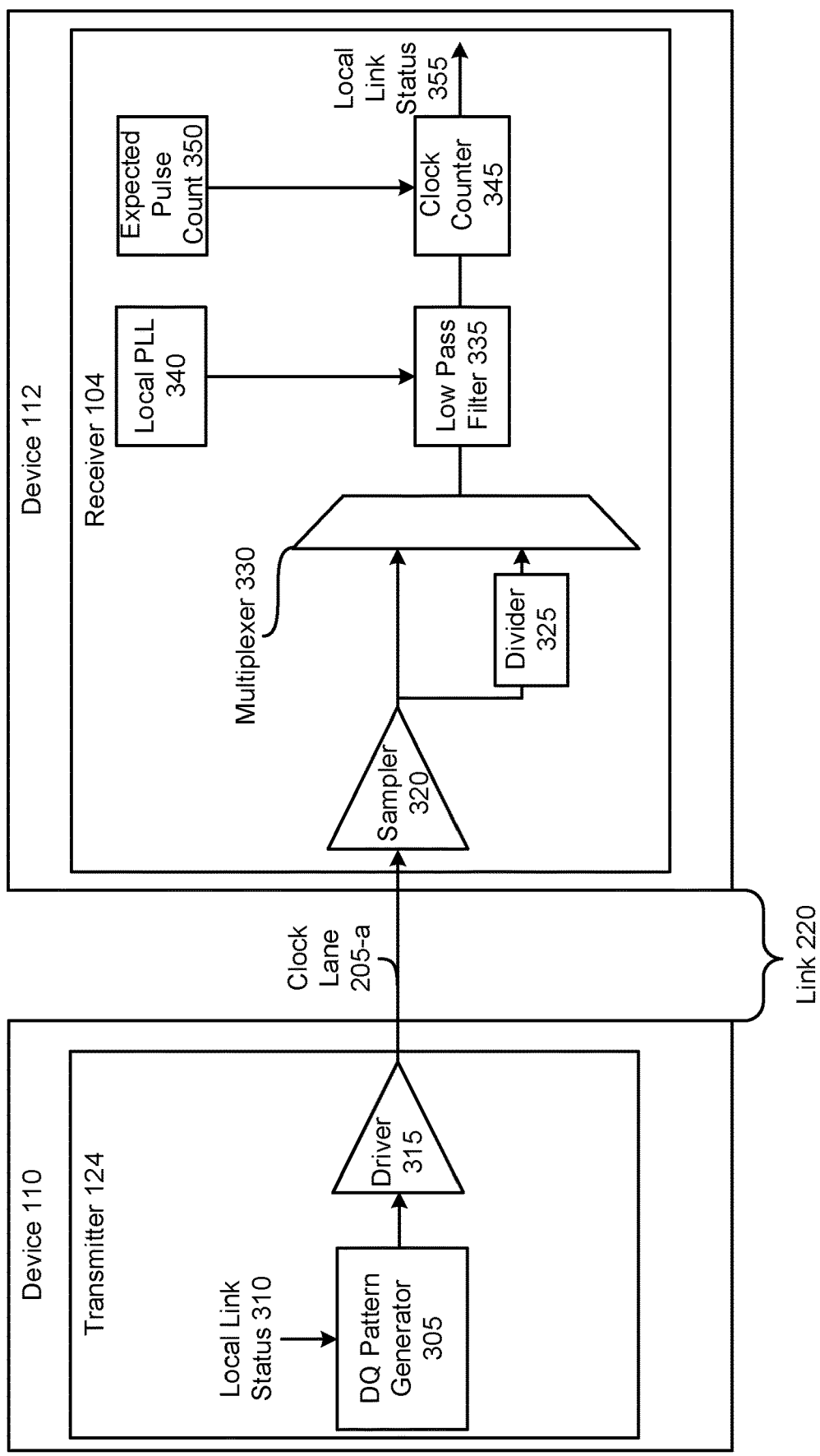
FIG. 3 is an example communication system employing a method for link status detection, in accordance with at least some embodiments.

FIG. 3 illustrates an example communication system 300 according to at least one example embodiment. In at least one embodiment, communication system 300 is an example of communication system 100 or 200 as described with reference to FIGS. 1 and 2. The system 300 includes a device 110 and a device 112 as described with reference to FIG. 1. The device 110 and device 112 can be coupled to a link 220 as described with reference to FIG. 2—e.g., a GRS link 220. Device 110 can include transmitter 124 as described with reference to FIG. 1, and device 112 can include a receiver 104 as described with reference to FIG. 1. In at least one embodiment, the components illustrated in receiver 104 can be considered a part of clock circuitry 115 as described with reference to FIG. 1. Although FIG. 3 illustrates circuitry corresponding to clock lane 205-a, communication system 300 can include similar circuitry corresponding to clock lane 205-b as described with reference to FIG. 2. That is, device 110 can also include a receiver 104, and device 112 can include transmitter 124 associated with clock lane 205-b. Transmitter 124 can include DQ pattern generator 305 and driver 315. Receiver 104 can include sampler 320, divider(s) 325, multiplexer 330, low pass filter (LPF) 335, local phase lock loop (PLL) 340, clock counter 345 and expected pulse count 350. In some embodiments, the LPF 335, local PLL 340, expected pulse count 350, and clock counter 345 can be digital logic. In at least one embodiment, clock counter 345 and expected pulse count 350 can be coupled to a controller or otherwise controlled by signals received from processing circuitry 132 as described with reference to FIG. 1.

In some embodiments, device 110 can power up, be brought out of reset, or otherwise perform initialization steps. In such embodiments, device 110 can initialize its receiver 104 first and then initialize transmitter 124. After initializing the transmitter 124, the transmitter 124 can begin transmitting a low-clock speed pattern as described with reference to FIG. 2. In such embodiments, DQ pattern generator 305 can be configured to generate a pattern to transmit. For example, DQ pattern generator 305 can generate a set of bits corresponding to the pattern. In some embodiments, DQ pattern generator 305 can be configured to receive a local link status 310 from the receiver 104 at device 110. In some embodiments, local link status 310 can indicate whether the receiver at device 110 has detected a low-speed clock pattern or signal from device 112. That is, DQ pattern generator 305 can be configured to generate the pattern from when the device 110 is initialized until the low-speed clock pattern is detected from the other device—e.g., the DQ pattern generator 305 can be configured to generate the pattern until the receiver 104 of device 110 detects a low-speed pattern from device 112. For example, if the local link status 310 indicates the link is not ready for training (e.g., there is no low-speed pattern detected from device 112), the DQ pattern generator 305 can continue generating the pattern and transmitting the pattern to driver 315. If the local link status 310 indicates the link is ready for training (e.g., the receiver 104 of device 110 has detected a low-speed pattern from device 112), the DQ pattern generator 305 can stop generating the pattern and stop transmitting bits to driver 315.

In an embodiment, driver 315 is configured to drive (e.g., transmit) the set of bits generated by the DQ pattern generator 305 at a low speed across the clock lane 205-a. For example, the driver 315 can transmit the set of bits corresponding to the pattern using a clock signal having a low-speed frequency (e.g., a first frequency). In some embodiments, the first frequency can be between 0.5-2.5 gigahertz as described with reference to FIG. 2. That is, the driver 315 is configured to drive the pattern at a frequency less than a frequency associated with data transmission operations. In some embodiments, driver 315 can include circuitry to transmit the pattern at the low-clock speed. In some embodiments, driver 315 can include a serializer to serialize the set of bits received from the DQ generator 305 across the clock lane 205-a—e.g., convert the parallel set of bits into serial bits and transmit the set of bits across the clock lane 205-a.

In an embodiment, sampler 320 can be configured to receive the set of bits and sample the set of bits. In at least one embodiment, sampler 320 can transmit the sampled set of bits received to a divider 325. In some embodiments, sampler 320 can transmit the sampling of the set of bits to the multiplexer 330—e.g., refrain from transmitting the sampled set of bits to the divider 325. In some embodiments, divider 325 can be configured to divide down the frequency of the set of bits received from device 110. For example, divider 325 can be configured to divide a clock speed received by 2, 4, 8, 16, etc. In some embodiments, device 112 can configure the divider 325 during the initialization of the receiver 104. That is, the device 112 can determine the low-speed clock pattern transmitted over the clock lane 205-b is too fast—e.g., channel noise of data offset can cause the low-speed clock pattern transmitted by the transmitter 124 of device 112 to be sent unreliably. In that, there can be a limit to how slow the transmitter 124 can transmit a signal. In embodiments where the minimum clock speed is unreliable, the device 112 can configure the divider 325 to divide further the clock speed received from device 110 to ensure the clock pattern received from device 110 is reliable. Although one divider 325 is shown, receiver 104 can include multiple dividers—e.g., include 2, 4, 8, 16, etc. dividers 325 based on the preferred clock speed of the device 104. Divider 325 can be configured to transmit the divided clock pattern (e.g. the divided sampled set of bits) to the multiplexer 330. In some embodiments, the multiplexer 330 is configured to multiplex the set of bits received from the sampler 320 or the divided set of bits received from divider 325 and transmit the multiplexed bits to the low pass filter 325.

In an embodiment, low pass filter 335 can be configured to refine further the sampled set of bits (or divided samples) from the multiplexer 330. That is, the low pass filter can remove short-term fluctuations and reduce noise on the sampled set of bits to enable the clock counter 345 to receive an improved sample or signal. In at least one embodiment, the low pass filter 335 can be coupled to a local PLL 340. In some embodiments, the local PLL 340 can generate output signals for the low pass filter 335. For example, the local PLL 340 can be initialized or configured to operate at the high-speed frequency (e.g., the frequency used for data transmission operations). In such embodiments, the local PLL 340 can be used to sample the received samples at the low pass filter 335. In that, the local PLL 340 and low pass filter 335 can be utilized to get rid of high-frequency components in an output of a phase detector—e.g., get rid of the higher frequencies to produce a signal with reduced noise for the clock counter 345.

In an embodiment, clock counter 345 can be configured to detect a number of pulses in the sampled set of bits (e.g., the detected pattern) received from the low pass filter 335 during a pre-defined period—e.g., or from the multiplexer 330 in embodiments where a low pass filter 335 is not used. In some embodiments, clock counter 345 can detect the number of pulses by determining a number of edges (e.g., the number of times the signal rises or falls) during the pre-defined duration. In that, the clock counter can determine the average frequency of the sampled set of bits—e.g., determine the average frequency of pattern received at the receiver 104 from the device 110. In some embodiments, the pre-defined period can be configurable. For example, the processing circuitry 132 or a controller coupled with the clock counter 345 can select a period for detecting the number of pulses—e.g., the processing circuitry 132 can select a period from a list of programmed number of possible periods. In some embodiments, the greater the period selected, the less likely noise affects the signal received—e.g., the low-speed clock pattern can be detected more accurately. In some embodiments, the smaller the period selected, the faster the status of the link can be determined—e.g., the overall initialization time can be reduced. Accordingly, the processing circuitry 132 can select the period based on a weighted consideration between accuracy and time—e.g., the processing circuitry 132 can select smaller periods when there is less noise in the communication system 300 and larger periods when there is more noise in the communication system 300. After detecting the number of pulses in the period, the clock counter can compare the detected number of pulses with an expected number of pulses received from an expected pulse count 350. That is, the expected pulse count 350 can store the expected number of pulses for the low-speed clock pattern transmitted and received in the communication system 300.

In some embodiments, if the detected number of pulses is different than the expected number of pulses, the clock counter 345 can determine the other device (e.g., device 110) is not ready to train the link—e.g., determine the link is not ready to be trained. In such embodiments, the clock counter 345 can transmit a local link status 355 to the transmitter 124 of device 112, indicating that the link is not ready to be trained. Accordingly, the transmitter 124 can continue transmitting the low-speed clock pattern to the device 110. That is, if the second device 112 is initialized first, device 112 can detect the low-speed clock pattern and transmit the low-speed lock pattern to the device 110. Because device 110 can fail to be initialized when the device 112 is sending and detecting for the low-speed clock pattern, the clock counter 345 can determine the number of pulses received is not the same as the expected number of pulses and indicate to the transmitter 124 of device 112 to keep transmitting the low-speed pattern.

In some embodiments, if the detected number of pulses is the same as (e.g., satisfies) the expected number of pulses, the clock counter 345 can determine the other device (e.g., device 110) is ready to train the link—e.g., determine the link is ready to be trained. In such embodiments, the clock counter 345 can transmit a local link status 355 to the transmitter 124 of device 112, indicating the link is ready to be trained. Accordingly, the transmitter 124 of device 112 can stop transmitting the low-speed clock pattern. That is, if the device 112 detects the low-speed clock pattern from device 110, then device 110 can also detect the low-speed clock pattern from device 112, and as such, both devices 110 and 112 can stop transmitting the low-speed clock pattern. In such embodiments, even if the device 110 and device 112 begin initialization asynchronously, at some point, the device 110 and 112 concurrently transmit the low-clock speed pattern and determine that the other device is ready for link training.

In some embodiments, the clock counter 345 can be configured to detect the number of pulses as being the same as the expected number of pulses for multiple periods. For example, the clock counter 345 can be configured to detect the number of pulses as being the same as the expected number of pulses for two (2) periods where each period has the same value. In other embodiments, the clock counter 345 can detect the number of pulses as being the same as the expected number of pulses for greater than two (2) periods. That is, even if the clock counter 345 can refrain from indicating the link is ready for training until the low-speed clock pattern is detected for the specified number of periods. In some embodiments, having the specified number of periods be greater than one (1) can increase accuracy and reduce false positives.

In some embodiments, device 110 and device 112 can proceed with link training after determining the link status—e.g., after determining the link is ready for training. In other examples, either device 110 or device 112 can wait for a second period—e.g., the devices can be configured to wait for the second period after determining the link status to ensure the other side also detected the link status or the other side is finished with performing other initialization steps before proceeding with link training. In some embodiments, device 110 or device 112 can perform remnant steps of the initialization process before initiating the link training—e.g., the devices can complete any remaining steps in the initialization process before proceeding with link training.

Figure 4:
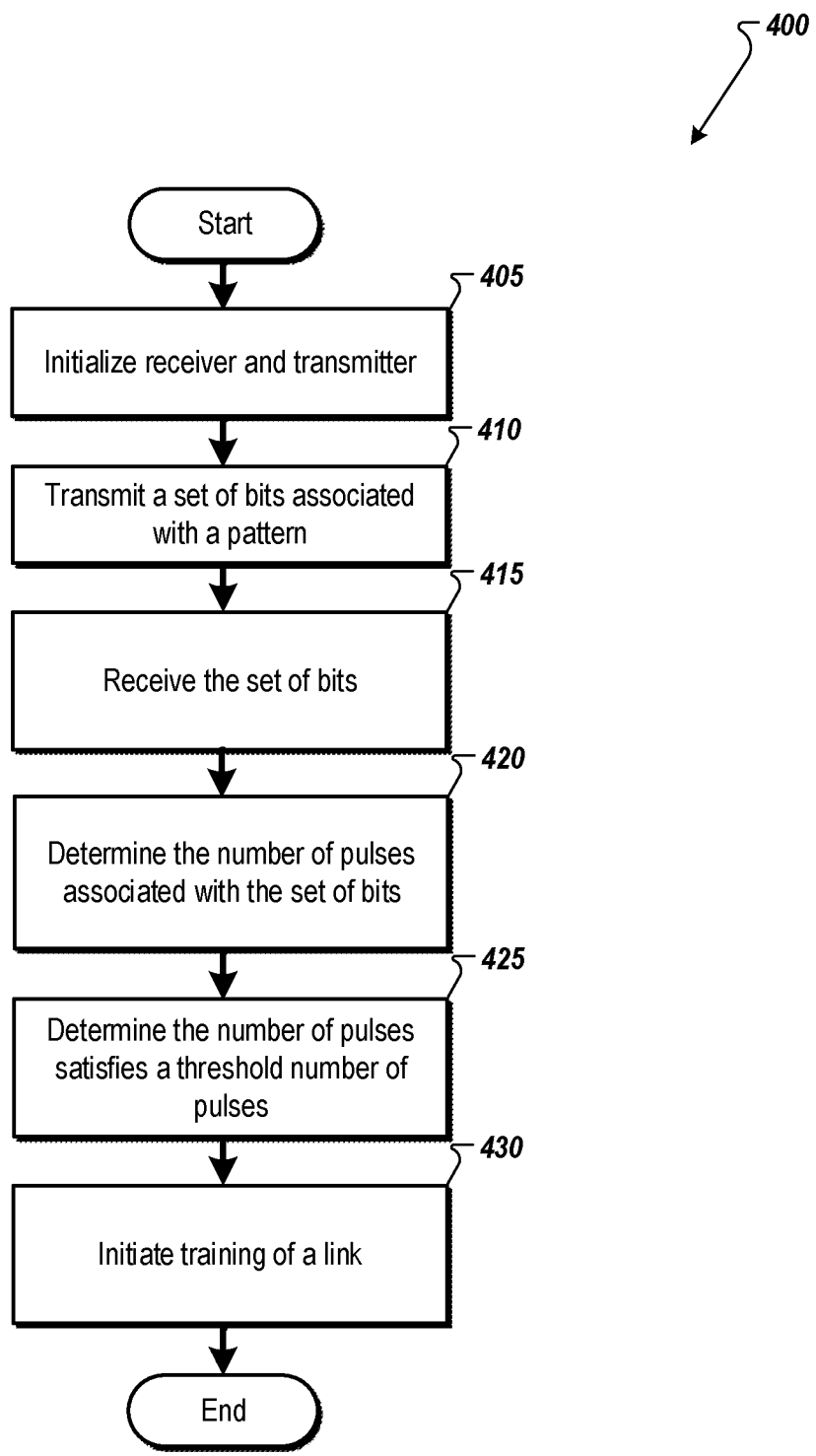
FIG. 4 is a flow diagram of a method for link status detection for a high-speed interconnect system, in accordance with at least some embodiments.

FIG. 4 illustrates a flow diagram of a method 400 for link status detection in a high-speed interconnect. For example, method 400 illustrates transmitting and detecting a low-speed clock pattern on a clock lane of the high-speed interconnect. The method 400 can be performed by processing logic comprising hardware, software, firmware, or any combination thereof. In at least one embodiment, the method 400 is performed by the transmitter 124 or receiver 104 of the first device 110 or second device 112 as described with reference to FIG. 4. In some embodiments, the messages can be communicated on a GRS link 220 as described with reference to FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments.

Thus, not all processes are required in every embodiment. Other diagrams illustrating a method for link training through handshaking are possible.

At operation 405, the first device 110 can initialize receiver 104 and transmitter 124. In some embodiments, the device 110 (e.g., first device or second device) can initialize receiver 104 before initializing transmitter 124. In some embodiments, the device 110 can initialize local PLL 340 while initializing receiver 104—e.g., setting the local PLL 340 to the high-speed frequency. In some embodiments, device 110 can initialize the clock counter 345 during the initialization of the receiver 104. For example, the device 110 can select a period for detecting a number of pulses as described with reference to FIG. 3—e.g., the device 110 or device 112 (e.g., either the first device or second device) can select a first period during which the number of pulses is determined from a plurality of periods, each period having a different value. In some embodiments, the device 110 can also select how many detection periods the detected number of pulses match the expected pulses before determining the link is ready for training as described with reference to FIG. 4—e.g., detecting that the number of pulses matches the expected number of pulses for two (2) or more periods. For example, the device 110 or device 112 can determine the number of pulses satisfies a predetermined condition relating to the number of pulses over a number of periods, each period of the number of periods having a same value, and where the number of periods satisfies a threshold number of periods for determining the number of pulses. In at least one embodiment, the device 110 can also initialize one or more dividers 325 as described with reference to FIG. 3. In some embodiments, the device 110 can initialize a local PLL of the transmitter 124 during the initialization of the transmitter 124. In such embodiments, the device 110 can configure the transmitter 124 to transmit at a low-speed—e.g., transmit using a first clock signal having a first frequency less than a second frequency associated with a second clock signal for data transmission operations as described with reference to FIG. 3.

At operation 410, device 110 can transmit a set of bits associated with a pattern via one or more paths associated with transmitting the clock signal. For example, the device 110 can generate the set of bits at the DQ pattern generator 305 and transmit the set of bits using the first clock signal at the first frequency. In some embodiments, the transmitter 124 can transmit the set of bits on the clock lane 205-a—e.g., on the forwarded clock lane of the GRS link 220.

At operation 415, device 112 can receive the set of bits from device 110. In at least one embodiment, device 112 can initialize (e.g., power on or come out of reset) before receiving the set of bits. That is, the device 112 can initialize its receiver 104 (e.g., enable the clock counter 345) and then initialize its transmitter 124 as described with reference to operation 405. In some embodiments, device 112 can sample the set of bits received at a sampler as described with reference to FIG. 3—e.g., the device 112 can determine the number of pulses in response to sampling the set of bits. In at least one embodiment, device 112 can utilize divider(s) 325 to divide down the first clock signal further as described with reference to FIG. 3—e.g., the device 112 can determine the number of pulses in response to dividing the first clock signal. In at least one embodiment, device 112 can utilize the low pass filter 335 and local PLL 340 to increase the reliability of the first clock signal as described with reference to FIG. 3—e.g., the device 112 can determine the number of pulses in the period in response to passing the first clock signal through a low pass filter 335.

In some embodiments, device 112 can transmit a second set of bits corresponding to the pattern at the first frequency while receiving the set of bits from device 110 as described with reference to FIG. 3. For example, the device 112 can transmit the second set of bits at a first time, the first time different than a second time the first device transmits the set of bits—e.g., the device 112 can transmit the second set of bits after the device 110 transmits the first set of bits. In that, device 110 and device 112 can begin the initialization asynchronously as described with reference to FIG. 3. In such embodiments, device 110 and device 112 can synchronize while detecting the link status as described with reference to FIG. 3. For example, the second set of bits can be transmitted concurrently with the first set of bits for a portion of the second period. In some embodiments, device 110 and device 112 can initialize synchronously. In such embodiments, device 112 can transmit the second set of bits for a second period, where the second set of bits are transmitted concurrently with the first set of bits transmitted by device 110 for a portion of the second period.

At operation 420, device 112 can determine the number of pulses associated with the set of bits over the first period. For example, device 112 can detect a number of edges in the sampled (e.g., or sampled and divided) first clock signal. In some embodiments, device 112 can determine an average frequency for the first clock signal for the first period. In some embodiments, device 110 can determine the number of pulses associated with the second set of bits concurrently with the device 112 determining the number of pulses associated with the set of bits. In some embodiments, device 110 can determine the number of pulses associated with the second set of bits concurrently with the second device 112 determining the number of pulses for the set of bits for a portion of the first period. That is, device 110 can determine the link status concurrent with device 112.

At operation 425, device 112 can determine if the number of pulses detected satisfies a predetermined condition relating to the number of pules. For example, the clock count 345 can compare the number of pulses detected over the first period with an expected number of pulses received from the expected pulse count 350. In at least one embodiment, if the number of pulses determined satisfies (e.g., matches or is equal to) the expected number of pulses, receiver 104 of device 112 can indicate a link status to transmitter 124 of device 112—e.g., the receiver 104 can indicate the link is ready for training. In such embodiments, device 112 can stop transmitting the second set of bits after determining the number of pulses satisfies the predetermined condition relating to the number of pulses. In some embodiments, device 112 can wait after determining the number of pulses satisfying the predetermined condition—e.g., device 112 can wait for device 110 or perform additional initialization operations before initiating link training. In some embodiments, device 110 can also determine that the detected number of pulses satisfies the predetermined condition relating to the number of pulses and stop transmitting the set of bits. In some embodiments, if the number of pulses determined does not satisfy the expected number of pulses, receiver 104 of device 112 can indicate the link is not ready to be trained to transmitter 124 of device 112. In such embodiments, transmitter 124 can continue transmitting the second set of bits, and the receiver 104 can continue detecting incoming patterns or signals.

At operation 430, device 112 can initiate the training of the link in response to determining the number of pulses that satisfies the predetermined condition relating to the number of pulses. For example, device 112 can transition from the low-speed clock signal to the high-speed clock signal—e.g., transition to the second frequency. For example, device 112 can transmit a third set of bits corresponding to the second clock signal via the one or more paths associated with transmitting the clock signal after initiating the link, the third set of bits transmitted at the second frequency. In some embodiments, device 112 can transmit the third set of bits after the second period—e.g., after the wait period. In some embodiments, device 110 can also transition its transmitter 124 from the low-speed operation to the high-speed operation. In some embodiments, device 110 and device 112 can proceed with link training after detecting the link status— e.g., after determining the other device is ready for link training.

Figure 5:
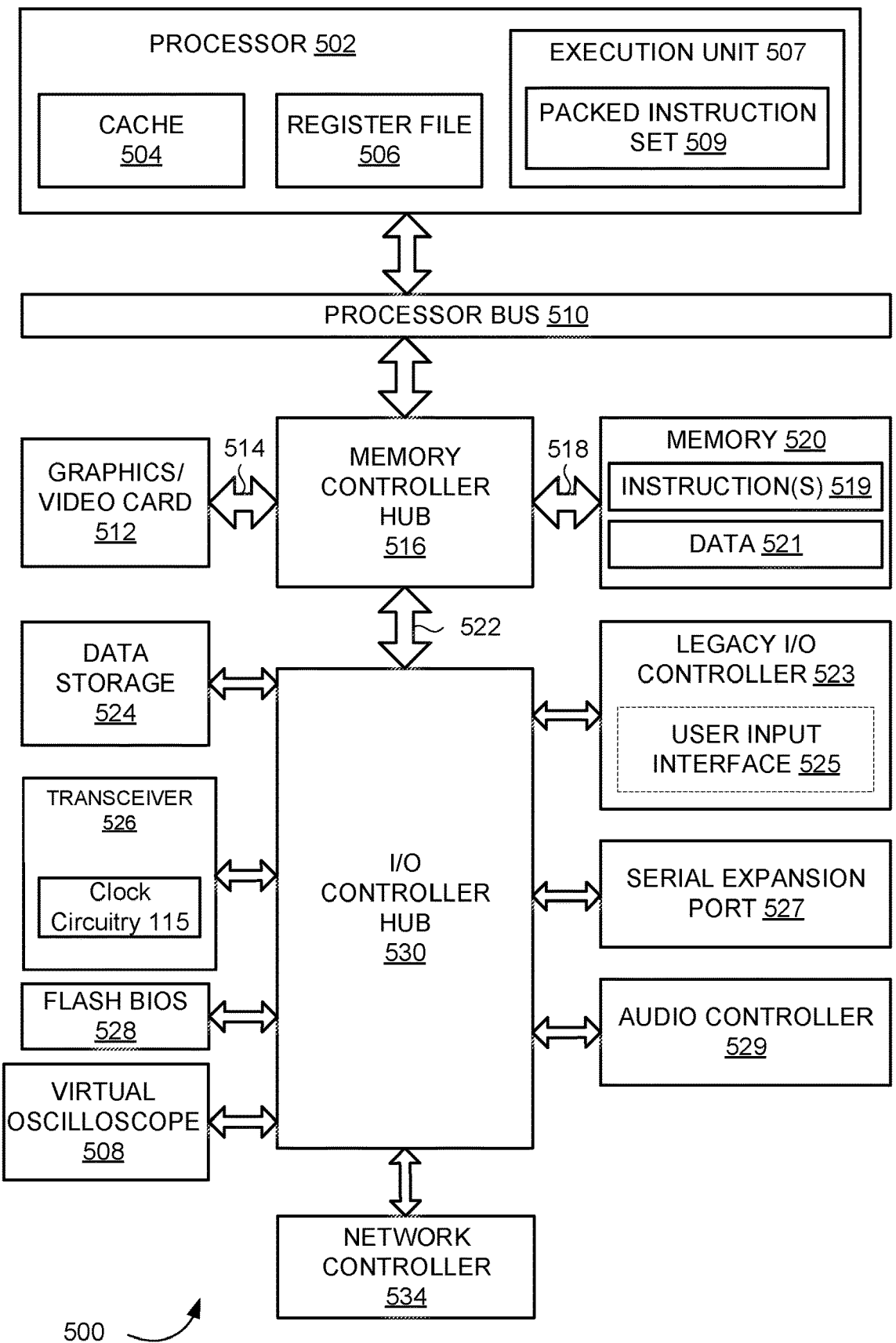
FIG. 5 illustrates an example computer system including a transceiver including a chip-to-chip interconnect for link status detection, in accordance with at least some embodiments.

FIG. 5 illustrates a computer system 500 including a transceiver including a chip-to-chip interconnect, in accordance with at least one embodiment. In at least one embodiment, computer system 500 may be a system with interconnected devices and components, an SOC, or some combination. In at least one embodiment, computer system 500 is formed with a processor 502 that may include execution units to execute an instruction. In at least one embodiment, computer system 500 may include, without limitation, a component, such as processor 502, to employ execution units including logic to perform algorithms for processing data. In at least one embodiment, computer system 500 may include processors, such as PENTIUM® Processor family, Xeon™, Itanium®, XScale™ and/or StrongARM™, Intel® Core™, or Intel® Nervana™ microprocessors available from Intel Corporation of Santa Clara, Calif., although other systems (including PCs having other microprocessors, engineering workstations, set-top boxes and like) may also be used. In at least one embodiment, computer system 500 may execute a version of WINDOWS' operating system available from Microsoft Corporation of Redmond, Wash., although other operating systems (UNIX and Linux for example), embedded software, and/or graphical user interfaces may also be used.

In at least one embodiment, computer system 500 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 500 may be used in devices such as graphics processing units (GPUs), network adapters, central processing units and network devices such as switch (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 500 may include, without limitation, processor 502 that may include, without limitation, one or more execution units 507 that may be configured to execute a Compute Unified Device Architecture ("CUDA") (CUDA® is developed by NVIDIA Corporation of Santa Clara, Calif.) program. In at least one embodiment, a CUDA program is at least a portion of a software application written in a CUDA programming language. In at least one embodiment, computer system 500 is a single processor desktop or server system. In at least one embodiment, computer system 500 may be a multiprocessor system. In at least one embodiment, processor 502 may include, without limitation, a CISC microprocessor, a RISC microprocessor, a VLIW microprocessor, a processor implementing a combination of instruction sets, or any other processor device, such as a digital signal processor, for example. In at least one embodiment, processor 502 may be coupled to a processor bus 510 that may transmit data signals between processor 502 and other components in computer system 500.

In at least one embodiment, processor 502 may include, without limitation, a Level 1 ("L1") internal cache memory ("cache") 504. In at least one embodiment, processor 502 may have a single internal cache or multiple levels of internal cache. In at least one embodiment, cache memory may reside external to processor 502. In at least one embodiment, processor 502 may also include a combination of both internal and external caches. In at least one embodiment, a register file 506 may store different types of data in various registers including, without limitation, integer registers, floating point registers, status registers, and instruction pointer register.

In at least one embodiment, execution unit 507, including, without limitation, logic to perform integer and floating point operations, also resides in processor 502. Processor 502 may also include a microcode ("ucode") read only memory ("ROM") that stores microcode for certain macro instructions. In at least one embodiment, execution unit 502 may include logic to handle a packed instruction set 509. In at least one embodiment, by including packed instruction set 509 in an instruction set of a general-purpose processor 502, along with associated circuitry to execute instructions, operations used by many multimedia applications may be performed using packed data in a general-purpose processor 502. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 500 may include, without limitation, a memory 520. In at least one embodiment, memory 520 may be implemented as a DRAM device, an SRAM device, flash memory device, or other memory device. Memory 520 may store instruction(s) 519 and/or data 521 represented by data signals that may be executed by processor 502.

In at least one embodiment, a system logic chip may be coupled to processor bus 510 and memory 520. In at least one embodiment, the system logic chip may include, without limitation, a memory controller hub ("MCH") 516, and processor 502 may communicate with MCH 516 via processor bus 510. In at least one embodiment, MCH 516 may provide a high bandwidth memory path 518 to memory 520 for instruction and data storage and for storage of graphics commands, data and textures. In at least one embodiment, MCH 516 may direct data signals between processor 502, memory 520, and other components in computer system 500 and to bridge data signals between processor bus 510, memory 520, and a system I/O 522. In at least one embodiment, a system logic chip may provide a graphics port for coupling to a graphics controller. In at least one embodiment, MCH 516 may be coupled to memory 520 through high bandwidth memory path 518, and graphics/video card 512 may be coupled to MCH 516 through an Accelerated Graphics Port ("AGP") interconnect 514.

In at least one embodiment, computer system 500 may use system I/O 522 that is a proprietary hub interface bus to couple MCH 516 to I/O controller hub ("ICH") 530. In at least one embodiment, ICH 530 may provide direct connections to some I/O devices via a local I/O bus. In at least one embodiment, a local I/O bus may include, without limitation, a high-speed I/O bus for connecting peripherals to memory 520, a chipset, and processor 502. Examples may include, without limitation, an audio controller 529, a firmware hub ("flash BIOS") 528, a transceiver 526, a data storage 524, a legacy I/O controller 523 containing a user input interface 525 and a keyboard interface, a serial expansion port 527, such as a USB, and a network controller 534. Data storage 524 may comprise a hard disk drive, a floppy disk drive, a CD-ROM device, a flash memory device, or other mass storage device. In an embodiment, the transceiver 526 includes a constrained FFE 508.

In at least one embodiment, FIG. 5 illustrates a system, which includes interconnected hardware devices or "chips" in the transceiver 526—e.g., the transceiver 526 includes a chip-to-chip interconnect including the first device 110 and second device 112 as described with reference to FIG. 1). In at least one embodiment, FIG. 5 may illustrate an exemplary SoC. In at least one embodiment, devices illustrated in FIG. 5 may be interconnected with proprietary interconnects, standardized interconnects (e.g., PCIe), or some combination thereof and utilize a GRS link 220 as described with reference to FIG. 2. In at least one embodiment, one or more components of system 500 are interconnected using compute express link ("CXL") interconnects. In an embodiment, the transceiver 526 can include clock circuitry 115 as described with reference to FIG. 1. In such embodiments, the clock circuitry 115 can facilitate a method for link status detection on a high-speed interconnect as described above. In an embodiment, clock circuitry 115 can detect patterns received. For example, the clock circuitry 115 can detect incoming patterns at a low clock speed and detect a number of pulses in the pattern in a pre-defined period. The clock circuitry 115 can compare the detected number of pulses with an expected number of pulses. If the clock circuitry 115 determines the number of pulses detected satisfy the expected number of pulses (e.g., the number of pulses detected is the same as the number of expected pulses), the clock circuitry 115 can determine the link is ready for training. Accordingly, the clock circuitry can be configured for link status detection as described with reference to FIGS. 2-4.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:
a link comprising one or more paths associated with transmitting data and one or more paths associated with transmitting a clock signal;
a first device coupled with the link and comprising a transmitter, the first device to:
transmit a set of bits associated with a pattern via the one or more paths associated with transmitting the clock signal, wherein the set of bits are transmitted using a first clock signal having a first frequency less than a second frequency associated with a second clock signal for data transmission operation; and
a second device coupled with the link and comprising a receiver, the second device to:
receive the set of bits associated with the pattern;
determine a number of pulses associated with the set of bits over a first period;
determine the number of pulses associated with the set of bits satisfies a predetermined condition relating to the number of pulses for the first period; and
initiate a training of the link in response to determining the number of pulses satisfies the predetermined condition relating to the number of pulses.

2. The system of claim 1, wherein the second device further comprises a transmitter, the second device is further to:
transmit a second set of bits associated with the pattern to a receiver of the first device for a second period, wherein the second set of bits is transmitted concurrently with the set of bits for a portion of the second period.

3. The system of claim 2, wherein the second device is further to:
stop transmitting the second set of bits after determining the number of pulses satisfies the predetermined condition relating to the number of pulses.

4. The system of claim 1, wherein the second device further comprises a transmitter, the second device is further to:
transmit a second set of bits associated with the pattern to a receiver of the first device at a first time, wherein the first time is different than a second time the first device transmits the set of bits.

5. The system of claim 1, wherein the first device is further to:
stop transmission of the set of bits associated with the pattern after the initiation of training the link; and
transmit a second set of bits corresponding to the second clock signal via the one or more paths associated with transmitting the clock signal, wherein the second set of bits are transmitted at the second frequency.

6. The system of claim 1, wherein the second device further comprises a sampler configured to sample the set of bits, and wherein the second device is to determine the number of pulses associated with the set of bits in response to sampling the set of bits.

7. The system of claim 1, wherein the second device is further to:
select the first period during which the number of pulses is determined from a plurality of periods, each period associated with a different value.

8. The system of claim 1, wherein the second device is further to:
determine the number of pulses satisfies the predetermined condition relating to the number of pulses over a number of periods, each period of the number of periods having a same value, and wherein the number of periods satisfies a threshold number of periods for determining the number of pulses.

9. A method, comprising:
receiving, by a first device, a set of bits associated with a pattern, wherein the set of bits are received as a first clock signal with a first frequency less than a second frequency associated with a second clock signal for data transmission operation;
determining, at the first device, a number of pulses associated with the set of bits over a first period;
determining, at the first device, the number of pulses associated with the set of bits satisfies a predetermined condition relating to the number of pulses for the first period; and
initiating a training of a link in response to determining the number of pulses satisfies the predetermined condition relating to the number of pulses.

10. The method of claim 9, further comprising:
transmitting, by the first device to a second device, a second set of bits associated with the pattern for a second period, wherein the second set of bits is transmitted concurrently with receiving the set of bits for a portion of the second period.

11. The method of claim 10, further comprising:
stopping the transmitting of the second set of bits after determining the number of pulses satisfies the predetermined condition relating to the number of pulses.

12. The method of claim 11, further comprising:
waiting for a second period after stopping the transmission of the second set of bits; and
transmitting a third set of bits corresponding to the second clock signal, via one or more paths of the link associated with transmitting the first clock signal and the second clock signal, after the second period, wherein the third set of bits are transmitted at the second frequency.

13. The method of claim 10, wherein the set of bits are transmitted at a first time and the second set of bits are transmitted at a second time, the first time different than the second time.

14. The method of claim 9, further comprising:
transmitting a second set of bits corresponding to the second clock signal via one or more paths of the link associated with transmitting the second clock signal after initiating the training of the link, wherein the second set of bits are transmitted at the second frequency.

15. The method of claim 9, further comprising:
selecting the first period during which the number of pulses is determined from a plurality of periods, each period associated with a different value.

16. The method of claim 9, further comprising:
determining the number of pulses satisfies the predetermined condition relating to the number of pulses over a number of periods, each period of the number of periods having a same value, and wherein the number of periods satisfies a threshold number of periods for determining the number of pulses.

17. The method of claim 9, further comprising:
initiating a receiver of the first device; and
in response to initiating the receiver, initiating a transmitter of the first device, wherein the transmitter is initiated before receiving the set of bits corresponding to the pattern.

18. The method of claim 9, further comprising:
dividing, at a divider, the first clock signal, wherein determining the number of pulses over the first period is based at least in part on dividing the first clock signal.

19. A device, comprising:
a receiver coupled with a link comprising one or more paths associated with transmitting data and one or more paths associated with transmitting a clock signal, the device to:
receive a set of bits associated with a pattern, wherein the set of bits are received as a first clock signal with a first frequency less than a second frequency associated with a second clock signal for data transmission operation;
determine a number of pulses associated with the set of bits over a first period;
determine the number of pulses associated with the set of bits satisfies a predetermined condition relating to the number of pulses for the first period; and
initiate a training of the link in response to determining the number of pulses satisfies the predetermined condition relating to the number of pulses.

20. The device of claim 19, further comprising:
a transmitter coupled to the link, the transmitter to:
transmit a second set of bits associated with the pattern for a second period, wherein the second set of bits is transmitted concurrently with receiving the set of bits for at least a portion of the second period.

* * * * *